March 10, 1959 W. L. MORGAN 2,876,676
ANTI-GLARE REAR VIEW MIRROR WITH FORWARD VIEW AREAS
Filed Dec. 30, 1953

INVENTOR.
Willard L. Morgan
BY Nobbe & Swope
ATTORNEYS

United States Patent Office 2,876,676
Patented Mar. 10, 1959

2,876,676

ANTI-GLARE REAR VIEW MIRROR WITH FORWARD VIEW AREAS

Willard L. Morgan, Pittsburgh, Pa., assignor to Libbey-Owens-Ford Glass Company, Toledo, Ohio, a corporation of Ohio Application December 30, 1953, Serial No. 401,281

4 Claims. (Cl. 88—77)

This invention relates broadly to rear view mirrors for automobiles and the like. More particularly, it relates to a novel rear view mirror providing complete rear view vision with a selection of reflected images of different intensities for day or night driving as well as allowing a complete and unobstructed direct forward view to be had to the front of the automobile.

In present day automotive design, the use of wider back windows in automobiles has increased and with this increased use has come a demand for rear view mirrors of greater overall length so that the view afforded by the wider back windows may be adequately covered by said mirrors. Thus, rear view mirrors have had to be increased in length from 5 to 6 inches up to as much as 9 to 10 inches or more. While these large mirrors provide excellent operation from the standpoint of rear vision, it has been found that they block out such a large zone of forward or front vision that the ability to see out the windshield of the automobile has in many instances been seriously impaired and head-on collisions have been directly traceable thereto. With such large mirrors it is particularly difficult in looking through the windshield to see a road which comes in from the right side of the driver, or which runs up a hill at a small angle to the level of the automobile, or on the other hand, a road which is level and at a small angle to a downwardly moving automobile. Similarly, the large mirrors have been found objectionable in blocking out vision of traffic signals as well as portions of the scenery from both the driver's and passenger's seats.

The present invention materially lessens these front view difficulties, and at the same time provides a complete coverage of the rear view automobile window by providing a mirror which will give a complete view of objects to the rear of the automobile, while also permitting an unobstructed view to be had through the front windshield of the automobile.

To provide the complete rear view as well as an unobstructed forward view, this invention utilizes the phenomenon of binocular vision. As is well known in viewing objects with binocular vision, images seen by each of the two eyes in front of the viewer are not located in the same horizontal position but are shifted apart from each other a short distance as may be noted when the same object is viewed alternately with one eye and then the other. As the vision is shifted from one eye to the other, the objects seem to shift their position horizontally or sidewise but, when both eyes are used, the mind combines the two individual images into a unitary picture.

Now, in applying the above mentioned phenomenon to an automobile rear view mirror, it has been found that when such a mirror is made of alternate transparent and alternate reflective areas of 1½ to 2½ inches wide, that the picture as seen in such mirror sections by one eye is displaced a distance corresponding to the distance between reflective areas when vision is shifted solely to the other eye. Thus, using the mirror sections which are spaced apart and of certain dimensions, the actual shifting of the image position as apparently seen by the eyes when one or the other is closed amounts to a shift within the range of 1½ to 2½ inches, when measured along the mirror surface, which is the distance between the alternate reflective or clear transparent areas. It is thus apparent, that if there is a succession of mirror sections approximately 1½ to 2½ inches in width along a horizontal line which are displaced or spaced apart from each other by clear transparent non-reflective areas 1½ to 2½ inches wide, that the mirror as seen with one eye will fit or focus upon one of the reflective blocks while the other eye will fit or focus on a reflective block horizontally spaced from the original first mirror area by 1½ to 2½ inches. Thus, when such a mirror arrangement is looked at with both eyes at a distance of approximately 18 inches from the mirror surface, such as occurs in the normal use of a rear view mirror in an automobile, the two eyes and the mind will bring together a complete visual picture and use the individual mirror strips or blocks together as though the mirror was a continuous mirror coating covering the entire space of the mirror arrangement. This combining of two spaced pictures is a result of the well known fact that the eye sees what the mind wants it to see and the picture presented is the result of the mind's interpretation of the responses sent by the eye.

To illustrate, if there is made an arrangement of alternately opaque screens 2 inches wide spaced by alternate clear openings 2 inches wide, all horizontally aligned, and the composite screen is held up in front of the viewer at a distance of approximately 18 inches from the eyes, the opaque areas of the screen will block out part of the front view when only one eye is used to view the screen. However, when this eye is closed and the other eye is open, the screens and the portion of the forward vision viewed previously seem to move horizontally and be displaced a short distance from their original position. It then becomes evident that the blocking opaque screens thus appear in apparent visual location with respect to the eyes displaced by approximately 2 inches from each. When both eyes are used, the viewer looks at scenes back of such screen placed at such a distance and it becomes apparent that the eyes see around the screen sections and past the ends of the entire screen assemblage and no blocking of the forward vision occurs as the mind combines the two images into a complete picture.

The invention thus comprises a wedge-type automobile rear view mirror placed in the conventional location in an automobile having horizontally aligned mirror elements and open window elements of between 1½ and 2½ inches wide as adjacent alternate mirror and window elements, and in which reflective coatings are employed on both surfaces of the wedge. Since the binocular visual shift as seen by each of the eyes results in a horizontal displacement only, it is only necessary that the horizontal widths of the separate mirror and transparent window elements be specified while the vertical lengths may be any reasonable value to adequately cover the height of the rear view window.

It will be apparent that the widths of the clear windows and reflective elements will change somewhat if the distance of the mirror from the driver's eyes is altered and, it will also be evident that the distance between the two eyes of various drivers will vary and will also affect the visual shifting distances. In this respect, the inventor has found that within the horizontal width range of 1½ to 2½ inches for the alternate mirror and window elements, that allowance is made for the variance in interpupillary distance between various drivers and also for the variance of distance from the driver's eyes to the mirror, which in present day automobiles ranges from 16 to 28 inches, depending of course upon the driver's stature, the seating arrangement, and the make of the automobile. Thus, in defining the horizontal widths of the various elements it will be apparent that the range of 1½ to 2½ inches as herein given is meant to cover variance of the above mentioned factors, and to take care of normal variance in the automobile driver's eyes relative to the location of the rear view mirror. These widths will obviously be such that as the mirror of the invention is moved further from or closer to the eye that the widths of the sections will increase or decrease. It has been found that the widths will be kept within a dimension which will subtend an angle of approximately 4.6° for the lower limit, and 8° for the upper limit when lines are projected from the proposed location of the mirror to the eyes. Thus, it will be apparent that if mirrors of the present invention are to be used at a distance of 36 inches from the eyes, that the width range of the respective sections would be from about 3 to 5 inches wide.

In view of the explanation given above, it will be apparent that the mirrors cannot be made to function if the mirror and the windows deviate from the set dimensions or alignments. Thus, a rear view mirror located in a conventional location in an automobile (from 16 to 28 inches from the driver's eyes) having mirror elements as wide as 3 inches has been found to block out a portion of the forward vision. In like manner, if a clear transparent area is made as wide as 3 inches, it is found that the open position is too wide to allow the eyes to completely focus upon the reflective areas and some of the rear view picture is missing. Likewise, when elements of clear window space or mirror space are made less than 1½ inches such as 1 inch or even one quarter of an inch, it is immediately found that confusion begins to result in the eyes and definite areas of view either to the front or the rear of the automobile are blocked out.

It is apparent that for the mind to be able to use pictures of adjacent separate small vertically aligned mirror elements together in a continuous picture, that each of such mirror elements must be in exactly the same plane or in closely aligned exact parallel planes with the vertical edges of the respective sections being substantially parallel. For this reason, it is a requirement of the invention that the mirror elements be arranged in such planes and preferably on a support of glass or other transparent media which has a flat continuous polished plane surface or two such parallel plane surfaces and, as will be more evident from a later description, the glass support may also be colored and it may also be of a wedge shape.

Reference is now made to a copending application by the same inventor, Serial No. 329,250, filed January 2, 1953, now U. S. Patent No. 2,796,805, which discloses an automobile rear view mirror providing both rear view and forward view pictures. In such mirror, however, the entire mirror may be coated and provided with a partially transparent reflective mirror coating which has definite limited ratios of reflection to transmission values. Such mirrors are also provided in which some of the areas are opaque but the partially transparent areas must have a reflection to transmission value varying within the ranges of 2.7 over 1 to approximately 1 over 2.7. In contrast, the windows of the present invention may constitute open spaces between separate mirror elements, the mirror elements being held in substantially the same plane, and the openings between such mirror elements being within the 1½ to 2½ inch width mentioned hereinabove; or, the mirrors of the invention may constitute a clear glass support carrying alternately spaced mirror elements having alternate clear openings of the transparent glass therebetween.

It is to be pointed out that in the rear view mirror of the present application, it is preferable that the open window elements be substantially free of reflection and by this I mean of not much more reflection than would occur from an ordinary transparent piece of glass which is of the order of 8½%. Such glass transmits approximately 90% of visible light, with the ratio of reflection to transmission being approximately 8½ to 90 or, 1 over 10.6 which is obviously such a small ratio of reflected image to light transmission that, as is shown in the prior application, it is hardly possible during daylight use of the rear view mirror to see any reflected images in such glass when viewing objects forwardly through the window areas. By way of illustration, when a mirror of the present invention is held up in front of the viewer or placed in proper position in the car it will be seen immediately that when one eye is shut no mirror image will appear in the clear transparent area, and under such circumstances, the eyes see clearly mirror elements as shadow masks placed across the forward view with the open windows showing only portions of the forward view. However, as mentioned hereinbefore, when both eyes are used the complete forward view becomes apparent and the driver sees around the mirror sections and past the ends of the mirror assemblage as though it were not present in space as the mind combines the images seen by each of the eyes.

Thus, it is a primary object of this invention to provide a rear view mirror for automobiles or the like which will provide the driver with a wide range of vision through the back window of the automobile with little or no obstruction of front view vision through the windshield.

It is still another object of the invention to provide a rear view mirror which may be of unlimited horizontal width to completely cover the view afforded by rear view windows of automobiles without obscuring any of the forward vision.

A further object of the invention is to provide a rear view mirror which during daytime will provide a complete view of the rear scene as well as a clear view of the forward picture without any substantial obstruction of the forward view to the driver, while also providing second and third degree reflectivities of lower intensities which may be used particularly at night or under extremely bright conditions by the slight angular shifting of the mirror position.

Further objects and advantages of the invention will become more apparent during the course of the following description when taken in connection with the accompanying drawings.

In the drawings, wherein like numerals are employed to designate like parts throughout the same:

With reference now to the drawings, there is disclosed a mirror element 10 which comprises a support body $a$ of glass or other transparent material which is wedge-shaped in vertical cross section and which is provided on both surfaces with alternately spaced vertically aligned mirror reflective coatings $b$ and $c$ of coextensive area. The coatings are arranged one behind the other with the coatings $b$ on the rear side of the wedge and the coatings c on the front side thereof having either their lower or upper edges in converging relationship while the other edges are more widely spaced apart. Thus, the mirror reflective means or coatings may be arranged upon a glass prism and disposed in non-parallel relationship or they may be arranged upon sheets of glass arranged in prism form.

The angle between the two mirror reflective coatings b and c is preferably of the order of three and one-fourth degrees, although, there may readily be used an angular separation between the two mirrors of two to ten degrees or more, the larger angular separation of close to ten degrees being preferable when a prism composed of glass sheets is used.

Figures 2, 3:
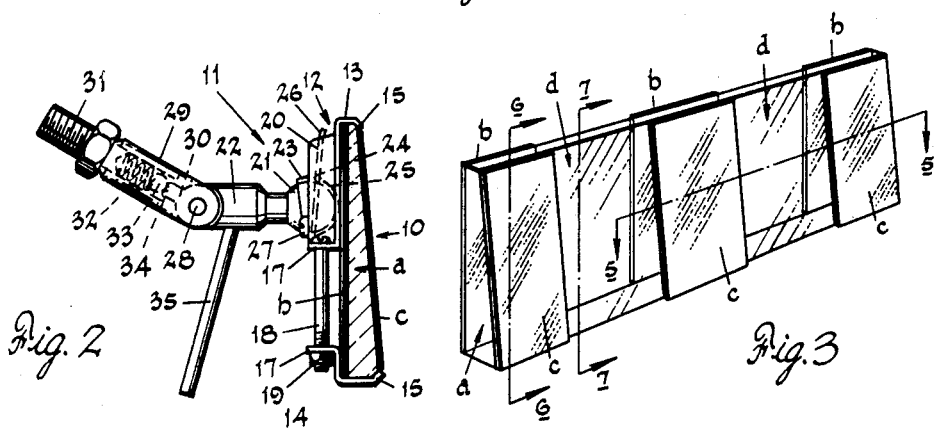
Fig. 2 is a side view of one type of mounting means that may be used with the invention.
Fig. 3 is a perspective view of a mirror support body constructed in accordance with the invention.

By way of example, the back surface of the support body a may carry the horizontally spaced strips of reflective mirror film b which, as a coating on a plane sheet of glass would have a reflectivity preferably ranging from 50% to 95% or more which is preferably opaque. These reflective strips are preferably 1½ to 2½ inches wide and are horizontally spaced from each other by clear transparent window areas d of the same range of widths, namely 1½ to 2 inches wide. On the other hand, the front surface of the support body a may carry a continuous low degree reflective film means c over its entire area, although usually as shown in Fig. 3, the front reflective areas are coextensive and superimposed to cover only the coated areas on the back surface of the wedge. This coating is semi-transparent, of substantially no light absorption, and where applied on such latter areas has a reflectivity of 10 to 70% for use in normal night driving and in daytime driving under snow and sun glare conditions.

In applying the various coatings to the mirror of the invention, it has been found that the mirror coatings that may be used may be any of those which have been employed in the making of rear view mirrors. For instance, the well known lead sulphide mirror providing 30% reflectivity may be used, or the lead sulphide mirrors similarly used and as described in U. S. Patent 2,430,452 by applicant as a coinventor wherein the mirror elements are of various colors and of reflectivities from 18 to 35% may be used. The mirror elements may also be formed by the use of chromium, copper, silver, or aluminum coatings such as have been used throughout the mirror art for sometime. However, in order to have a rear view mirror with a minimum of glare at night time it is preferred to have a combination of coatings providing reflectivities of less than 30%. This can be secured with lead sulphide and chromium coatings on the reflective sections on the rear surface of the wedge. Chromium coatings may also be used in transparent form on either surface and they may be backed up and made opaque on the back surface by the application of black paint upon such coatings.

Figure 1:
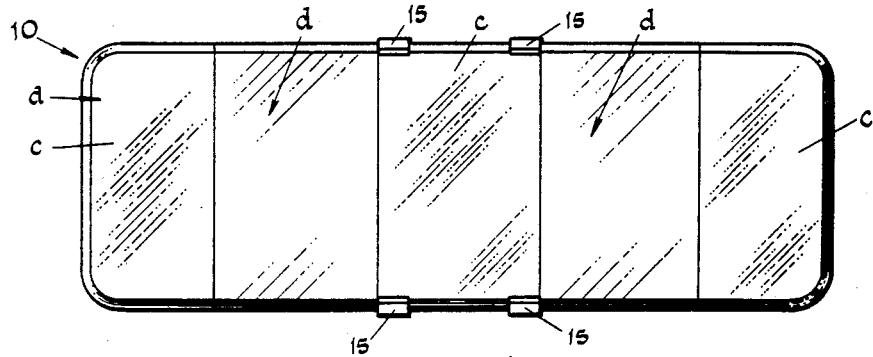
Fig. 1 is a front view of one type of rear view mirror assembly constructed in accordance with this invention.

According to the invention, the mirror element 10 is carried by a novel mounting means 11 which is especially constructed to carry out the objects of the invention by providing adequate support for said mirror member while at the same time permitting unobstructed light transmission through the transparent window areas d. This mounting comprises generally a frame member 12 which includes spaced upper and lower sections 13 and 14, respectively, of any suitable light metal which sections are bent at their forward edge to form fingers 15 which substantially grip the longitudinal edges of the mirror members 10, said fingers being spaced apart as shown in Fig. 1. Opposite the fingers 15, the frame sections 13 and 14 are provided with flanged portions 17 which receive screws 18 extending between the sections and by means of which said sections may be maintained through nuts 19 in active gripping relation with the edges of the mirror member 10. It will be understood that the means of attaching frame member 12 to the mirror member 10 not only permits the frame to be readily detached therefrom but also permits the frame to be adjusted longitudinally of the mirror member to the desired position by the mere manipulation of the nuts 19.

The central portion 20 of the upper frame section 12 is raised outwardly to receive a ball member 21 on the inwardly disposed end of arm 22 in a seat 23 formed in said raised portion. Strap 24, having a seat portion 25, is disposed inwardly of said raised portion for maintaining ball member 21 of the arm 22 in slidably engaged position between said seat portions 23 and 25. Tongue 26 at the upper end of said strap is inserted through a slot in said central portion and screws 27 on the lower end thereof serve to maintain ball member 21 in its above described operative position. It will thus be understood that the mirror and frame members may be moved universally with respect to arm 22 to dispose said mirror in the desired position. It will further be understood that the ball and socket formed by ball member 21 and seat portions 23 and 25 permit the mirror and frame members to be readily detached from the arm 22.

As is well known in the art, the purpose of the wedge type rear view mirror is to provide the driver with a choice of rear view images of various brightnesses by selectively positioning the mirror element by angular adjustment while at the same time keeping the mirror in the proper position to view objects to the rear of the automobile. This angular adjustment or tilting of the mirror 10 is effected by movement of the arm 22 which is pivotally attached as at 28 to a bifurcated arm 29 which receives a complementary tongue member 30 on the arm 22. The outer end of end arm 29 is suitably threaded as at 31 for attachment to a rigid part of an automobile and the opposite inner end is bored as at 32 to receive a spring loaded ball 33. Projecting outwardly from the tongue member 30 on intermediate arm 22 is a notched finger 34 which is resiliently engaged by the ball 33 and holds the mirror in one of three positioning notches on the finger.

A handle 35 depending from the arm 22 permits the driver to manually manipulate the position of the notched finger 34 with respect to the ball 33 of rigidly mounted arm 29 so as to move the surfaces of the mirror member 10 to three distinct and angularly related positions. In this manner, of course, three rear view images of different light intensities for each of the mirror members may be obtained.

Figures 5, 6, 7:
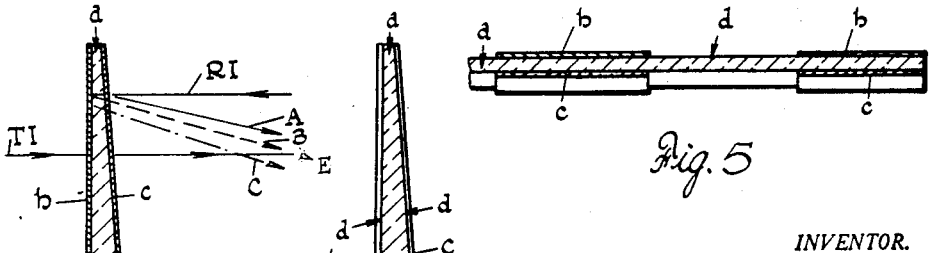
Fig. 5 is a partial longitudinal sectional view taken substantially along line 5—5 of Fig. 3.
Fig. 6 is a transverse sectional view of the mirror element taken substantially along line 6—6 of Fig. 3.
Fig. 7 is a view similar to Fig. 6 taken along line 7—7 of Fig. 3.

More particularly with reference to Fig. 2, and to a more detailed description of the mounting means given in Patent 2,588,792 to D. W. Barkley, the driver by means of the rear view mirror assembly shown therein may alternately locate two or more rear view images of differing light intensities of the same limited common field of rear view in his normal line of sight by selectively positioning the mirror element 10 by angular adjustment of the mounting 11. By way of illustration, there is shown in Fig. 6 an incident ray of light RI from a rear view image, which ray strikes the front coating c of the support body a and is partially reflected therefrom as at A. Inasmuch as the front coating c is partially transparent the portion of the incident ray RI will be transmitted to the rear reflective surface b of the support body a and be reflected therefrom as at B and transmitted through the front coating c. In addition, a portion of the ray reflected from the rear coating b will be reflected to the rear of the front coating c and reflected back to the rear coating b to form the light ray C. Thus, it will be apparent that with the construction shown herein, three rear view images of different light intensities may be presented to the eye of the driver by manipulation of the mounting 11 to angularly dispose the surfaces of mirror member 10 in the desired position.

To more particularly illustrate, the mirror support a shown in Fig. 6 is disposed in such a position as to provide the eye E of the driver with a reflection as at B of the rear view image from the rear reflective surface b of the support body a. As well, ray TI indicates an incident ray from the front view image transmitted through the transparent windows *d* of the support member *a* to the driver's eye E. Since the back reflective areas *b* and the front reflective areas *c*, as well as the window areas *d* are all 1½ to 2½ inches wide, it is evident that the driver of the automobile uses the binocular vision principle to view images of various intensity to the rear of the automobile or to have a clear unobstructed view through the mirror to the front of the automobile.

It will be understood that the particular "wedge" type rear view mirror illustrated herein is not formed as part of this invention except in connection with the construction thereof which permits rear view vision as well as front view vision through a portion thereof. That is, the particular types of mirror members 10 illustrated are old in the art insofar as the types of images produced thereby are concerned and are disclosed in Patent Nos. 1,949,138, 2,397,947, and in the copending application Serial No. 235,790 filed by D. W. Barkley.

Figure 4:
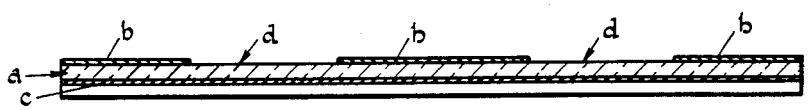
Fig. 4 is a longitudinal sectional view of an embodiment of a mirror support body constructed in accordance with the invention.

An alternate embodiment of the invention is shown in Fig. 4 wherein the principal difference is that the entire front surface of the wedge has a continuous mirror coating thereon. As herein shown, the mirror coating *c* may cover the entire front surface, which coating in addition to being reflective in the manner and for the purposes described with respect to the prior art, is partially transparent for the purposes of the invention. That is, the rear view mirror assembly is not only productive of the many advantages to be derived from "wedge" type mirrors of the type above noted but also embodies the advantages of the present invention in permitting complete front view vision through the window areas *d*. Thus, the front surface reflective mirror coating *c* may cover the entire front surface of the wedge and is partially transparent and similar to those described in connection with prior art wedge mirrors, although it is generally restricted to reflective mirror sections which are separated by clear uncoated windows as in the first embodiment. When a mirror of this type is tilted to one of the three positions the driver of the automobile may view objects with image intensity A given off by the partially transparent reflective coating *c* on the front surface of the support body *a* or, by tilting to another position he may view objects with the image intensity B given off by the alternate opaque mirror reflective strips *b* on the rear surface of the support body or, by tilting the mirror still farther he may view objects with the intensity of the ray C which image is first impressed upon the opaque reflective strips *b* and then is reflected to the back surface of the reflective coating *c* from where it is reflected again to the opaque reflective coating *b* and thence along the path C to the driver's eyes. In using the reflectivities designated by rays B and C, it is evident the driver of the automobile uses the binocular vision principle described hereinbefore since both rays depend on images reflected in one way or another from the alternate reflective strips on the surfaces of the support body. In like manner, using the same binocular principle it is also apparent that at all times the driver may be able to view objects to the front of the automobile through the alternate transparent window areas *d* depending of course upon the focus of the eye and the intention of his mind.

It will also be apparent that due to the location of the rear view mirror in an automobile to the right of the driver and either at or somewhat above his normal eye level, at night the lights of oncoming automobiles which are to the left of the driver will not appear in the mirror. Thus, the mirror seldom transmits any oncoming light rays to the driver along his normal line of forward sight except in the case of an occasional lighted sign of store front to the upper right of the driver, on the other hand, the rear view mirror of the present invention does permit the ready sighting therethrough of traffic lights. However, the comparatively low intensity of such illuminations have been found to present no difficulties with this mirror, and at night the mirror appears for the most part as though it were the ordinary opaque rear view mirror as the forward field of view is dark. Thus, when using a "wedge" type mirror made in accordance with this invention, which mirror presents two selective ranges of reflectivity of the rear view, there is no real possibility of light transmission at night through the mirror which would cause any difficulty.

The glass supports and wedges described in the mirrors herein may be made of the usual plate glass having high light transmission of 92% or they may be made of colored glass supports such as the flush pink of 83% transmission, gold yellow 87% transmission, green-blue of 72%, or the blue of 36% transmission, or other colored glasses of reduced transmission. These glasses not only permit the forming of colored transmitted rays but in the case of mirrors having a reflective coating on the rear surface thereof also act to give a colored reflection effect.

It will also be evident as more particularly shown by the following examples, that the reflective films may provide color and a coating may actually be built up of a number of films so as to produce a given color or degree of reflection and transmission in accordance with light interference phenomena. The coatings used for the mirrors of the invention may be formed in any suitable manner, such as by the thermal evaporation in a vacuum, or by chemical deposition, and may comprise any of the many mirror reflective coatings which can be formed in partially transparent form. Since the coatings are at least partially exposed to handling, the corrosion resistant hard coatings provided by chromium, manganese, vanadium, nickel, Inconel, titanium, and the metal oxides and fluorides, such as aluminum oxide, titanium oxide, and magnesium fluoride, are particularly useful.

*Example 1*

A "wedge" of clear glass with a three degree angle between the opposite faces thereof was coated in certain sections only on the rear face with a three layer light interference reflective coating of partially transparent nature by alternately depositing by thermal evaporation within a vacuum a layer of zinc sulfide, a layer of magnesium fluoride, and of zinc sulfide, each of said layers being formed of a quarter wave thickness of the respective material with respect to 5500 Angstrom units as the basis for setting the thicknesses. The resultant coating was of 48% reflectivity and of 48% transmission. As shown in Fig. 4, only a central 2 inch area, and end areas 1¼ inches wide were thus coated leaving clear uncoated openings 2 inches wide between these coated sections. Opaque black paint was then applied directly to this coating in the said central area and the end areas. The front surface was then completely coated with a partially transparent coating of chromium of a thickness such that on a flat glass blank it had a reflection from the coated side of 10% and a light transmission of 70%. From the front surface coating of chromium on the wedge there was secured a 10% reflection useful in night driving. From the rear surface of the "wedge" when viewing through the wedge a reflection of 23% was secured, such being the resultant of the reflection properties of the rear coating modified by the properties of the front coating. When placed in a suitable mounting which permitted shifting of the mirror angularly to select the images from the one face or the other, the mirror proved very satisfactory when used as an automobile mirror. Of course, the two inch clear partially transparent areas on the mirror were superimposed over openings in the mounting to permit viewing therethrough. Such openings transmitted 70% of light. The mirror could alternately be used to present rear view images of two different brightnesses, or by changing the focus of the eyes, could be viewed through to allow the driver to see objects to the front of the automobile.

*Example 2*

The front surface of an eight inch "wedge" similar to the one of Example 1 was coated in certain sections only with the three layered coating therein described, and corresponding sections on the rear surface of the wedge were then coated with a single layer interference coating which coating corresponded to the areas covered by the front coating as is shown in Fig. 3. This rear surface coating was a one quarter wave thickness of titanium dioxide giving 26% reflection and 70% transmission when deposited on a single glass plate. Black opaque paint was then applied to the coated areas only over this single layer coating on the rear surface of the "wedge." These coatings were applied to a central 2½ inch wide area and two end areas one inch wide leaving two 2 inch clear spaces having no coatings thereon between the three coated areas. The mirror was then placed in a suitable mounting having the framing and holding members therefor concentrated behind the opaque central mirror section and having either clear areas or openings to the sides of the framing members. These openings corresponded to the two 2 inch wide transparent uncoated glass areas so as to not obstruct vision through such areas of the mirror. Any suitable shifting apparatus, such as, for example, that shown in Fig. 2 which provides a plurality of positions for angularly moving the mirror to select the various separate images provided by this mirror may be used. In this mirror, the image formed by reflection from the front surface of the mirror was 48% reflective and is that which would be used in daytime driving. In daytime the mirror worked well in providing rear view and forward view through the same alternatively. The mirror also provided an alternative selection of three images for night driving in addition to the day or bright image. Since the day mirror is 48% reflective, it is not particularly useful for most night driving conditions as it glares with bright headlights. However, this value is excellent in daytime, and the other reflective values of 7%, 1%, and 0.2% may alternately be selected so that any night time glare conditions may be easily avoided with the 7% reflection value offering excellent utility for night driving generally.

*Example 3*

As in Example 2 a glass wedge was coated on the front face in similar sections as coated in Example 1 with the same three layer coating. In corresponding areas only on the rear face, the wedge was coated with an opaque chromium coating. This mirror when mounted in a suitable frame with openings in the frame corresponding to the uncoated window areas on the wedge was found to offer very little if any forward view blocking. As desired, a selection could be made by the angular adjustment of the mirror between the reflection values of 48% from the front face for day driving or the reflection values of 13.7%, 3.8%, or 1.0% from the rear face for use during night driving.

I claim:

1. A rear view mirror for automobiles and the like, comprising a wedge-shaped transparent support body having opposite surfaces disposed at an angle to one another, a plurality of spaced horizontally aligned mirror elements and alternate windows adjacent one another, said mirror elements comprising a coating carried by the rear surface of the support body and of such reflectivity as to substantially restrict vision therethrough, said alternate windows being substantially transparent and allowing substantial vision therethrough, and a partially transparent mirror coating carried by the front surface of said support body to coact with said mirror elements to produce images of different intensities, said transparent coating covering on the front surface of the support body only the area covered by the spaced mirror elements on the rear surface of the support body.

2. A rear view mirror for automobiles and the like as defined in claim 1, in which the mirror elements on the rear surface of the support body and the spaced windows between said elements are each substantially 1½ to 2½ inches wide.

3. A rear view mirror for automobiles and the like as defined in claim 1, in which the surfaces of the support body are disposed at an angle of approximately 2° to 10° relative to each other.

4. A rear view mirror for automobiles and the like as defined in claim 1, in which said alternate mirror elements are vertical, and opaque.

References Cited in the file of this patent

UNITED STATES PATENTS

| | | |
|---|---|---|
| 2,009,167 | Delano | July 23, 1935 |
| 2,669,159 | Rogers | Feb. 16, 1954 |
| 2,684,013 | Rosenbloom | July 20, 1954 |
| 2,796,805 | Morgan | June 25, 1957 |